(12) United States Patent
Sumiya (10) Patent No.: US 12,288,572 B2
(45) Date of Patent: Apr. 29, 2025

(54) STORAGE CASE AND PACKAGE (71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 303 days.

(21) Appl. No.: 17/683,263

(22) Filed: Feb. 28, 2022

(65) Prior Publication Data

US 2022/0310130 A1    Sep. 29, 2022

(30) Foreign Application Priority Data

Mar. 29, 2021  (JP) ................................ 2021-056175

(51) Int. Cl.
*G11B 33/02* (2006.01)
*G11B 5/008* (2006.01)

(52) U.S. Cl.
CPC ........ *G11B 33/022* (2013.01); *G11B 5/00813* (2013.01)

(58) Field of Classification Search
CPC ... G11B 33/022; G11B 33/04; G11B 5/00813; B65D 85/00; B65D 85/30; B65D 85/671; B65D 5/48038
See application file for complete search history.

(56) References Cited

U.S. PATENT DOCUMENTS

| 2007/0045310 A1* | 3/2007 | Yoshino ............... B65D 25/107 |
| | | 220/4.21 |
| 2007/0175777 A1 | 8/2007 | Imai |
| 2007/0181453 A1 | 8/2007 | Imai et al. |
| 2009/0078603 A1 | 3/2009 | Imai |
| 2019/0295599 A1* | 9/2019 | Sumiya ............... B65D 85/671 |

FOREIGN PATENT DOCUMENTS

| EP | 0023977 A1 | 2/1981 |
| JP | S45-037375 B | 11/1970 |
| JP | H09-290886 A | 11/1997 |
| JP | 2007-062742 A | 3/2007 |
| JP | 2007-204080 A | 8/2007 |
| JP | 2007-204086 A | 8/2007 |
| JP | 2009-078829 A | 4/2009 |
| JP | 2009-208821 A | 9/2009 |

OTHER PUBLICATIONS

English language translation of the following: Notice dated May 7, 2024 from the JPO in a Japanese patent application No. 2021-056175 corresponding to the instant patent application. This office action translation is submitted now in order to supplement the understanding of the cited references which are being disclosed in the instant Information Disclosure Statement.
English language translation of the following: Office action dated Sep. 3, 2024 from the JPO in a Japanese patent application No. 2021-056175 corresponding to the instant patent application.
English language translation of the following: Office action dated Nov. 12, 2024 from the JPO in a Japanese patent application No. 2021-056175 corresponding to the instant patent application.

* cited by examiner

*Primary Examiner* — Yan Lan
(74) *Attorney, Agent, or Firm* — SOLARIS Intellectual Property Group, PLLC (57) ABSTRACT

A storage case includes a support surface that supports side surfaces of a plurality of magnetic tape cartridges, and the support surface has a first surface, and a second surface positioned closer to the side surfaces than the first surface.

10 Claims, 5 Drawing Sheets

STORAGE CASE AND PACKAGE

CROSS-REFERENCE TO RELATED APPLICATIONS

This application claims priority under 35 USC 119 from Japanese Patent Application No. 2021-056175 filed on Mar. 29, 2021, the disclosure of which is incorporated by reference herein.

BACKGROUND

1. Technical Field

A technique of the present disclosure relates to a storage case and a package.

2. Related Art

JP2007-204080A discloses a cartridge storage case that stores a tabular cartridge in which a magnetic tape-wound reel is provided. The cartridge storage case comprises a plurality of compartments that hold a cartridge group in which a plurality of cartridges are arranged in parallel in a thickness direction and are made in a block shape, and a partition that divides the inside of the storage case to substantially form the compartments.

JP2007-204086A discloses a cartridge storage case that stores a tabular cartridge in which a magnetic tape-wound reel is provided. The cartridge storage case comprises at least one compartment that holds a cartridge group in which a plurality of cartridges are arranged in parallel in a thickness direction and are made in a block shape, and a buffer rib that is formed to protrude from at least an outer surface of the compartment in a cartridge thickness direction.

JP2009-78829A discloses a cartridge storage case that stores a tabular cartridge in which a magnetic tape-wound reel is provided. The cartridge storage case is used in a state of being superimposed on another cartridge storage case, and can hold the cartridge inside. The cartridge storage case has at least one compartment that stores a cartridge group in which a plurality of cartridges are arranged in parallel, and a humidity control agent is disposed in a buffer portion on an inner wall surface of the compartment.

SUMMARY

An embodiment according to the technique of the present disclosure provides a storage case and a package capable of reducing abrasion of a support surface compared to a structure in which a support surface supporting side surfaces of a plurality of magnetic tape cartridges supports the side surfaces of a plurality of magnetic tape cartridges on the whole surface.

A first aspect according to the technique of the present disclosure is a storage case comprising a support surface that supports side surfaces of a plurality of magnetic tape cartridges, and in which the support surface has a first surface, and a second surface positioned closer to the side surfaces than the first surface.

A second aspect according to the technique of the present disclosure is the storage case according to the first aspect, in which the first surface is positioned on an outer peripheral edge side of the support surface, and the second surface is positioned closer to a center side of the support surface than the first surface.

A third aspect according to the technique of the present disclosure is the storage case according to the first aspect or the second aspect, in which the support surface is formed of a resin material.

A fourth aspect according to the technique of the present disclosure is the storage case according to any one of the first aspect to the third aspect, in which the second surface is a plane.

A fifth aspect according to the technique of the present disclosure is the storage case according to any one of the first aspect to the fourth aspect, in which a step is formed between the first surface and the second surface, and a dimension of the step is equal to or greater than 0.1 mm and equal to or less than 1.3 mm.

A sixth aspect according to the technique of the present disclosure is the storage case according to any one of the first aspect to the fifth aspect, in which a plurality of support surfaces are provided.

A seventh aspect according to the technique of the present disclosure is the storage case according to any one of the first aspect to the sixth aspect, in which the storage case is formed of polyethylene terephthalate.

An eighth aspect according to the technique of the present disclosure is the storage case according to any one of the first aspect to the sixth aspect, in which the storage case is formed of polypropylene or polystyrene.

A ninth aspect according to the technique of the present disclosure is the storage case according to any one of the first aspect to the eighth aspect, further comprising a first case member having a first support surface as the support surface, and a second case member having a second support surface as the support surface.

A tenth aspect according to the technique of the present disclosure is the storage case according to the ninth aspect, in which the first case member and the second case member store the magnetic tape cartridge by being superimposed in a direction in which the first support surface and the second support surface face each other.

An eleventh aspect according to the technique of the present disclosure is the storage case according to the ninth aspect or the tenth aspect, in which the first case member has a first superimposing surface including the first support surface, the second case member has a second superimposing surface facing an opposite direction to a direction that the second support surface faces, and the first superimposing surface and the second superimposing surface have shapes to be superimposed on each other.

A twelfth aspect according to the technique of the present disclosure is the storage case according to any one of the first aspect to the eleventh aspect, in which a center portion of each of the side surfaces is recessed to an inner peripheral side of each of the magnetic tape cartridges with respect to an end portion of the side surface, the first surface supports the end portion, and the second surface supports the center portion.

A thirteenth aspect according to the technique of the present disclosure is a package comprising the storage case according to any one of the first aspect to the twelfth aspect, and a plurality of magnetic tape cartridges.

BRIEF DESCRIPTION OF THE DRAWINGS

Exemplary embodiments of the present disclosure will be described in detail based on the following figures, wherein.

DETAILED DESCRIPTION

Hereinafter, an example of an embodiment of a storage case and a package according to the technique of the present disclosure will be described following the drawings.

First, an example of the configuration of a storage case 10 will be described referring to FIGS. 1 to 7. In the following description, for convenience of description, in FIGS. 1 to 4, a direction of an arrow A is referred to as an upward direction of the storage case 10, and a side in the upward direction of the storage case 10 is referred to as an upper side of the storage case 10. In the following description of the structure, "up" indicates the "upper side" of the storage case 10.

In the following description, for convenience of description, in FIGS. 1 and 2, a direction opposite to the direction of the arrow A is referred to as a downward direction, and a side in the downward direction of the storage case 10 is referred to as a lower side of the storage case 10. In the following description of the structure, "down" indicates the lower side of the storage case 10.

In the following description, for convenience of description, in FIGS. 1 and 2, a direction of an arrow B perpendicular to the direction of the arrow A is referred to as a front direction of the storage case 10, and a side in the front direction of the storage case 10 is referred to as a front side of the storage case 10. In the following description of the structure, "front" indicates the front side of the storage case 10.

In the following description, for convenience of description, in FIGS. 1 and 2, a rear direction opposite to the direction of the arrow B is referred to as a rear direction, and a side in the rear direction of the storage case 10 is referred to as a rear side of the storage case 10. In the following description of the structure, "rear" indicates the rear side of the storage case 10.

In the following description, for convenience of description, in FIGS. 1 and 2, a direction perpendicular to the direction of the arrow A and the direction of the arrow B is indicated by an arrow C, a direction of the arrow C is referred to as a left direction of the storage case 10, and a side in the left direction of the storage case 10 is referred to as a left side of the storage case 10. In the following description of the structure, "left" indicates the left side of the storage case 10.

In the following description, for convenience of description, in FIGS. 1 and 2, a direction opposite to the direction of the arrow C is referred to as a right direction, and a side in the right direction of the storage case 10 is referred to as a right side of the storage case 10. In the following description of the structure, "right" indicates the right side of the storage case 10.

In the following description, in indicating a direction, the storage case 10 is abbreviated as a "case" like a case up-down direction, a case front-rear direction, and a case right-left direction.

Figure 1:
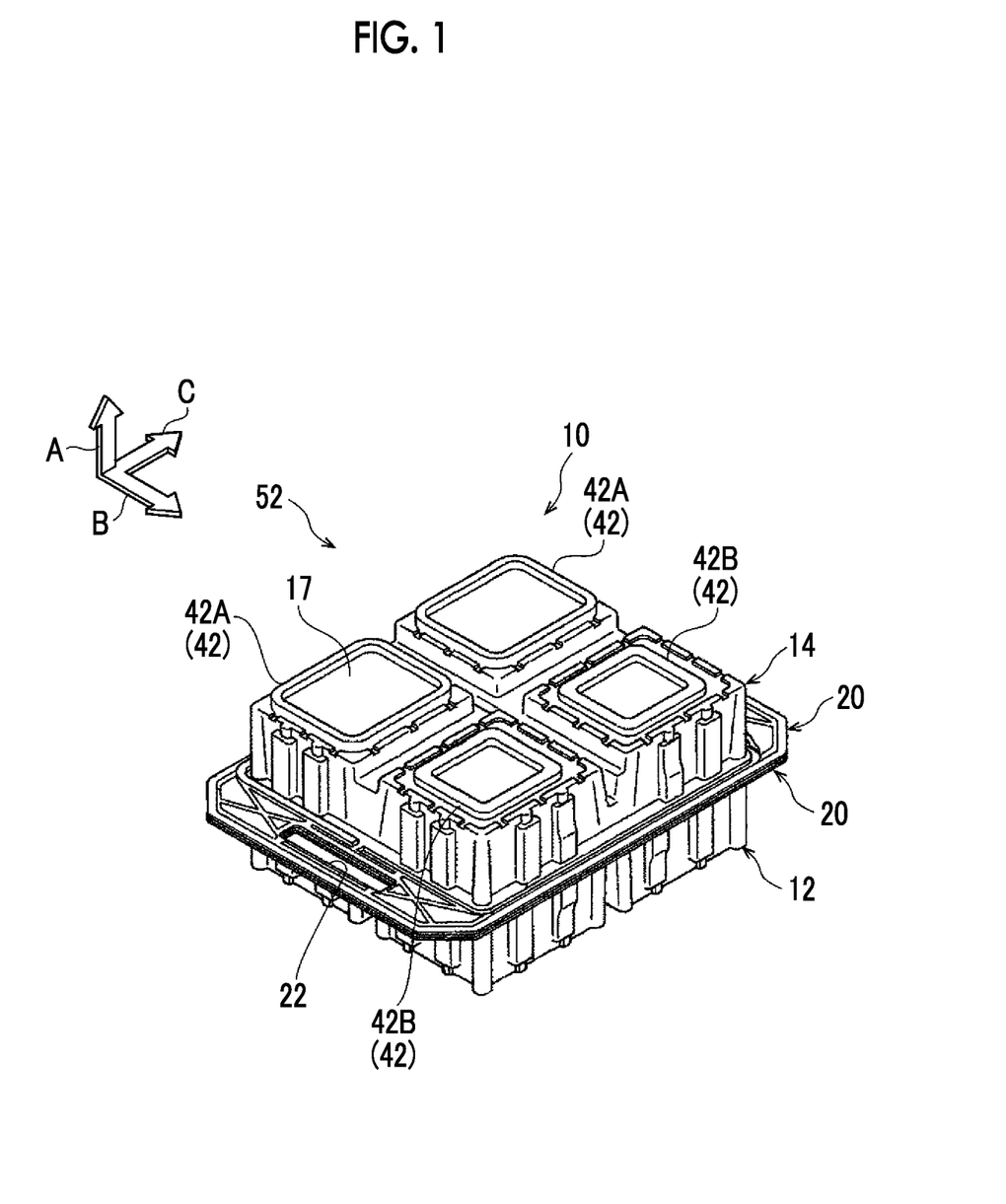
FIG. 1 is a perspective view of a storage case according to an embodiment.

The front-rear direction and the right-left direction of the storage case 10 are not limited to the directions shown in FIG. 1.

Figure 2:
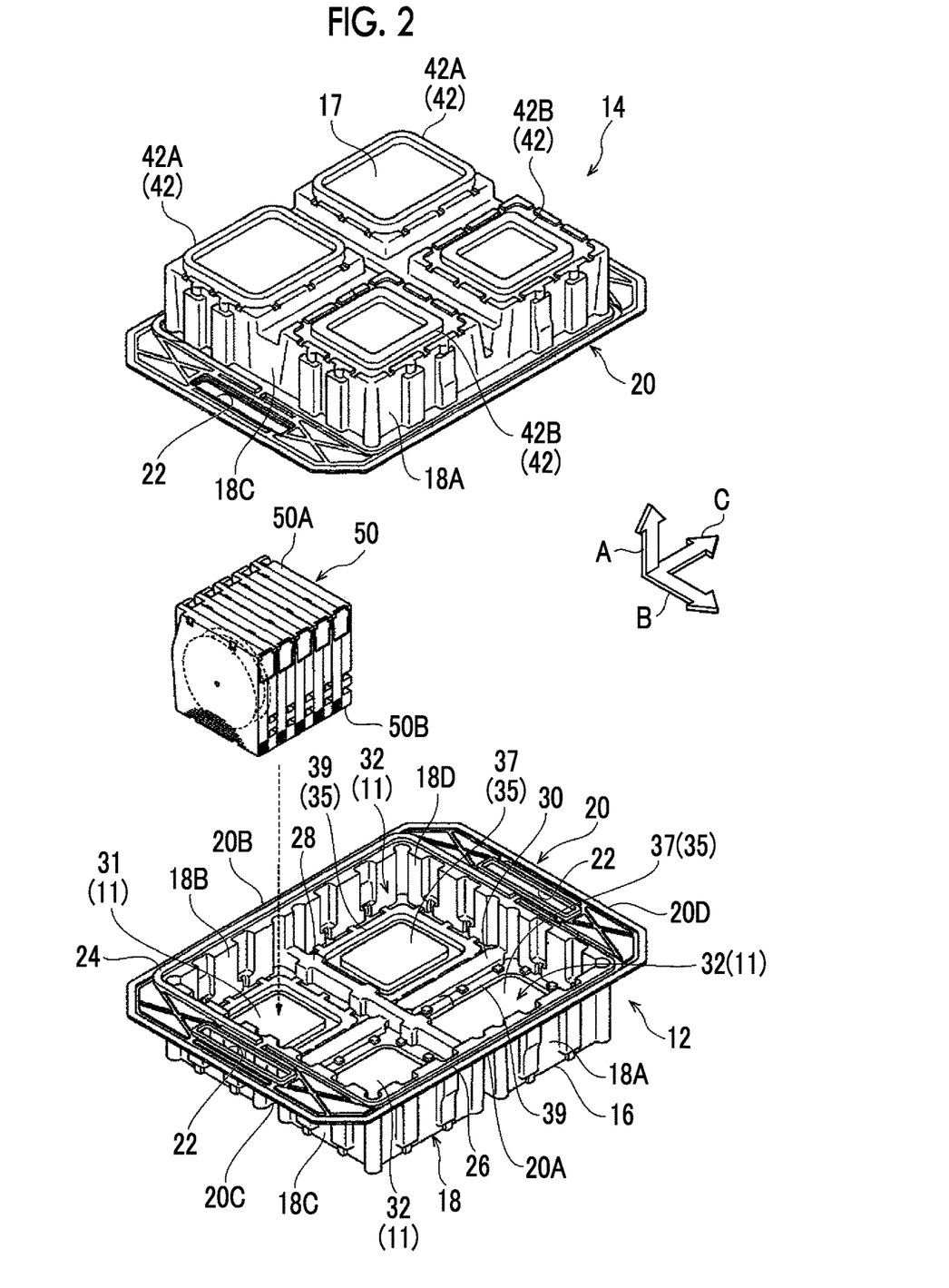
FIG. 2 is an exploded perspective view of the storage case of FIG. 1.

As shown in FIG. 2 as an example, the storage case 10 is used in storing a plurality of magnetic tape cartridges 50. In the following description, the magnetic tape cartridge 50 is abbreviated as a cartridge 50.

As an example, the shape of the cartridge 50 is a flat shape. Inside the cartridge 50, a cartridge reel (not shown) is housed. The cartridge reel is rotatably supported by a rotation support mechanism (not shown) in the cartridge 50. Around an outer peripheral surface of the cartridge reel, a magnetic tape (not shown) is wound. A rotation axis direction of the cartridge reel corresponds to a thickness direction of the cartridge 50.

As shown in FIG. 2 as an example, the storage case 10 comprises a lower case 12 and an upper case 14. The lower case 12 forms a lower half of the storage case 10. The upper case 14 forms an upper half of the storage case 10. The storage case 10 is formed in such a manner that the lower case 12 and the upper case 14 are assembled in the up-down direction. The lower case 12 is an example of a "first case member" according to the technique of the present disclosure. The upper case 14 is an example of a "second case member" according to the technique of the present disclosure.

Inside the storage case 10, a plurality of storage chambers 11 are formed. As an example, inside the storage case 10, four storage chambers 11 are formed. Each of the storage chambers 11 has a size to store a plurality of cartridges 50 in a state of being arranged in a thickness direction of the cartridge 50. As an example, each of the storage chambers 11 has a size to store five cartridges 50 in a state of being arranged in the thickness direction of the cartridge 50. Accordingly, in the storage case 10, in a case where the five cartridges 50 are stored in each of the storage chambers 11, 20 cartridges 50 can be stored in total.

Figure 3:
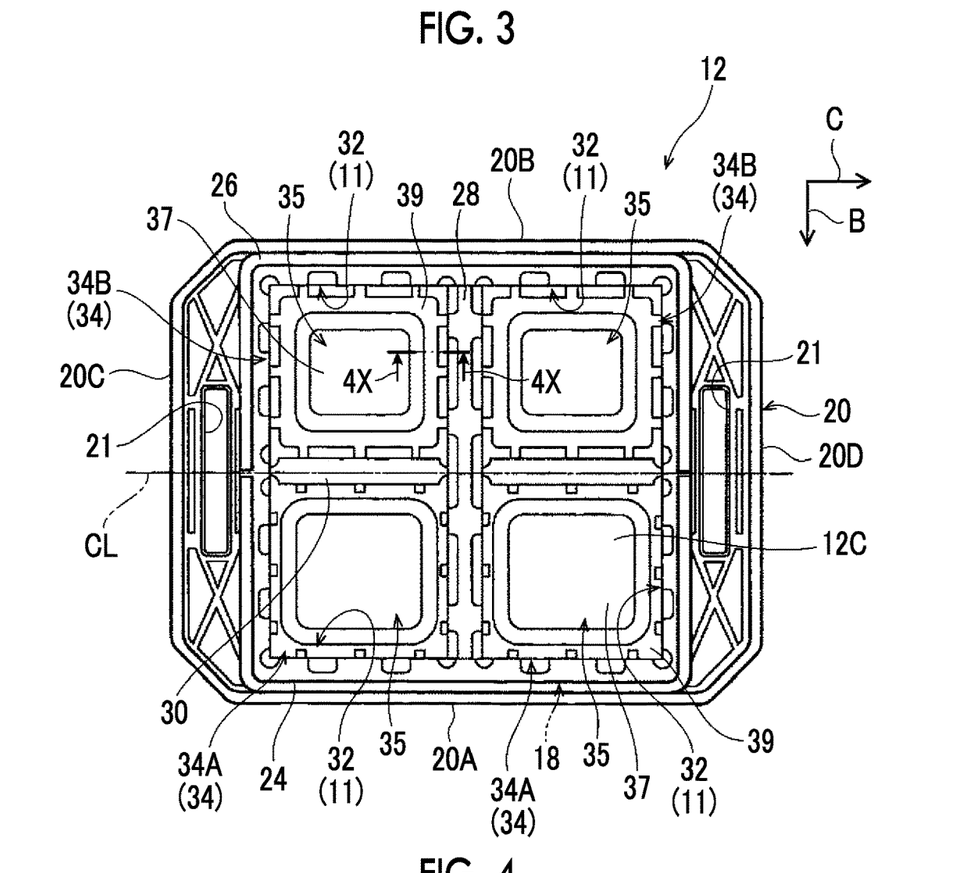
FIG. 3 is a plan view of a lower case provided in the storage case of FIG. 1.

As shown in FIGS. 2 and 3 as an example, the lower case 12 has a bottom plate 16, a peripheral wall 18, and a flange portion 20.

The bottom plate 16 is formed in a rectangular shape in plan view (see FIG. 3). Here, the term "rectangular shape in plan view" also includes a rectangular shape in which corner portions are curved in an arc shape in plan view.

The peripheral wall 18 is provided upright at a peripheral edge of the bottom plate 16. The peripheral wall 18 is formed in a rectangular frame shape in plan view (see FIG. 3). Here, the term "rectangular frame shape in plan view" also includes a rectangular frame shape in which corner portions and/or nook portions are curved in an arc shape. As an example, the peripheral wall 18 has a front wall portion 18A positioned in the case front direction, a rear wall portion 18B positioned in the case rear direction, a right wall portion 18C positioned in the case right direction, and a left wall portion 18D positioned in the case left direction.

The flange portion 20 projects from an upper end portion of the peripheral wall 18 to an opposite side to the bottom plate 16 side. As an example, the flange portion 20 has flange portions 20A, 20B, 20C, and 20D. The flange portion 20A is a portion projecting from the front wall portion 18A. The flange portion 20B is a portion projecting from the rear wall portion 18B. The flange portion 20C is a portion projecting from the right wall portion 18C. The flange portion 20D is a portion projecting from the left wall portion 18D. Handhold holes 22 are formed in the flange portion 20C and the flange portion 20D, respectively. The handhold holes 22 are used in a case where a user transports the lower case 12.

The lower case 12 has an engaging convex portion 24 and an engaging concave portion 26. The engaging convex portion 24 is formed on a front surface of the flange portion 20. As an example, the engaging convex portion 24 extends on the front surface of the flange portion 20 along a circumferential direction of the peripheral wall 18. In detail, the engaging convex portion 24 extends from a center portion of the flange portion 20C in the case front-rear direction to a center portion of the flange portion 20D in the case front-rear direction through the flange portion 20B. The engaging concave portion 26 has a shape to be engaged with the engaging convex portion 24. The engaging convex portion 24 is formed on a front surface of the flange portion 20. As an example, the engaging concave portion 26 extends on the front surface of the flange portion 20 along the circumferential direction of the peripheral wall 18. In detail, the engaging convex portion 24 extends from the center portion of the flange portion 20C in the case front-rear direction to the center portion of the flange portion 20D in the case front-rear direction through the flange portion 20A.

As shown in FIGS. 2 and 3 as an example, a first rib 28 and a second rib 30 are provided in the bottom plate 16. The first rib 28 is a protruding portion formed by making the bottom plate 16 protrude upward as an example. The first rib 28 extends from a center portion of the front wall portion 18A in the case right-left direction to a center portion of the rear wall portion 18B in the case right-left direction along the case front-rear direction.

As an example, the second rib 30 is a protruding portion formed by making the bottom plate 16 protrude upward. The second rib 30 extends in the case right-left direction from a center portion of the right wall portion 18C in the case front-rear direction to a center portion of the left wall portion 18D in the case front-rear direction. The first rib 28 and the second rib 30 are connected in the center portion of the bottom plate 16.

The inside of the lower case 12 is partitioned into four storage regions 32 by the first rib 28 and the second rib 30 as an example. The four storage regions 32 of the lower case 12 form four storage chambers 11 of the storage case 10. As shown in FIG. 3 as an example, the storage regions 32 are regions surrounded by the peripheral wall 18, the first rib 28, and the second rib 30 in plan view.

As shown in FIGS. 2 and 3 as an example, in the bottom plate 16, a support portion 34 is formed in a region corresponding to each of the storage regions 32. The support portion 34 comprises a support surface 35 that supports side surfaces 50B of a plurality of cartridges 50. The support portion 34 has an inside support portion 36 and an outside support portion 38. The support surface 35 is an example of a "support surface" and a "first support surface" according to the technique of the present disclosure.

As an example, the inside support portion 36 is a protruding portion formed by making the bottom plate 16 protrude upward. The inside support portion 36 is formed in a rectangular shape in plan view (see FIG. 3).

As an example, the outside support portion 38 is a protruding portion formed by making the bottom plate 16 protrude upward. The outside support portion 38 is formed in a rectangular frame shape in plan view (see FIG. 3). The outside support portion 38 surrounds the inside support portion 36.

As an example, the support surface 35 has an outside support surface 39 and an inside support surface 37. The outside support surface 39 is an example of a "first surface" according to the technique of the present disclosure. The inside support surface 37 is an example of a "second surface" according to the technique of the present disclosure.

As an example, the outside support surface 39 is an upper surface of the outside support portion 38. The outside support surface 39 is formed in a rectangular frame shape in plan view. The outside support surface 39 is positioned on an outer peripheral edge side of the support surface 35.

As an example, the inside support surface 37 is an upper surface of the inside support portion 36. The inside support surface 37 is formed in a rectangular shape in plan view. The inside support surface 37 is a plane. The inside support surface 37 is positioned closer to a center side of the support surface 35 than the outside support surface 39. Here, the term "plane" indicates a plane in a meaning including an error that is generally allowed in the technical field to which the technique of the present disclosure belongs, and an error to such an extent not contrary to the spirit and scope of the technique of the present disclosure, in addition to a complete plane.

Figure 4:
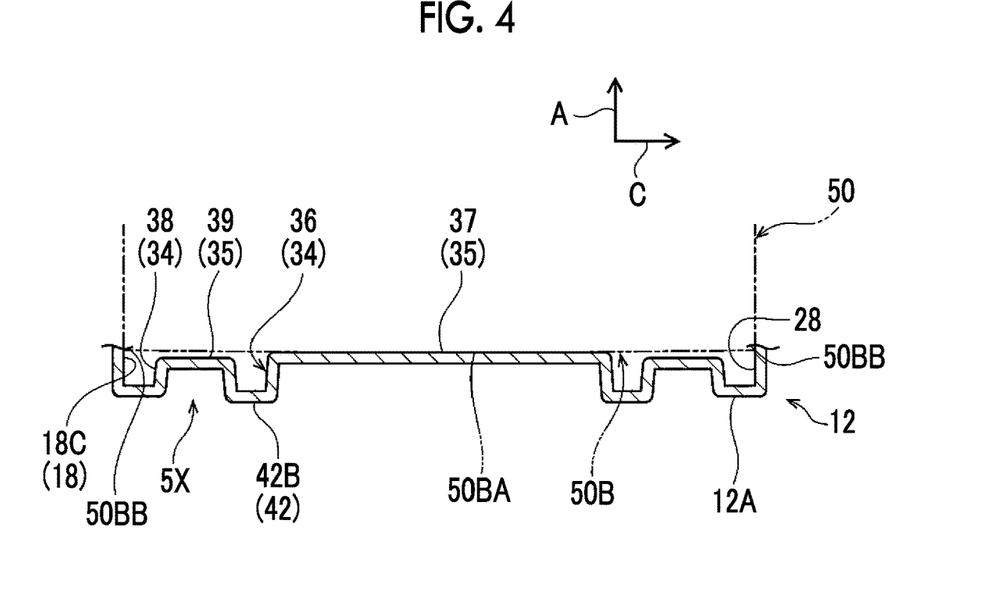
FIG. 4 is a sectional view taken along the line 4X-4X of FIG. 3.

As shown in FIG. 4 as an example, the inside support surface 37 is positioned closer to the side surface 50B of the cartridge 50 than the outside support surface 39. Here, a state of being positioned close to the side surface 50B of the cartridge 50 indicates that the inside support surface 37 is positioned higher than the outside support surface 39 in the lower case 12.

Figure 5:
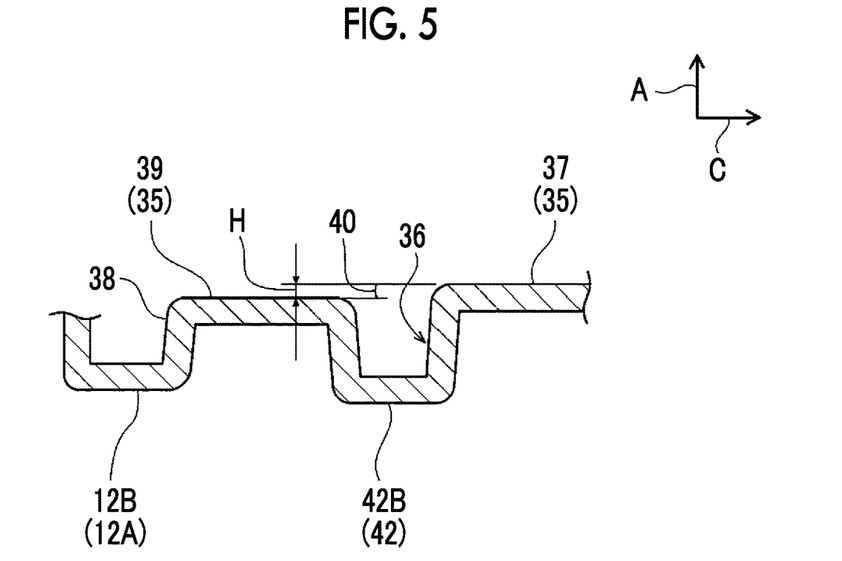
FIG. 5 is an enlarged view of a portion indicated by an arrow 5X of FIG. 4.

As shown in FIG. 5 as an example, a step 40 is formed between the outside support surface 39 and the inside support surface 37. A dimension H of the step 40 in the case up-down direction is equal to or greater than 0.1 mm and equal to or less than 1.3 mm.

As an example, in the storage region 32 of the lower case 12, the cartridge 50 is stored in a state in which the side surface 50A (see FIG. 1) facing a direction of being loaded into a drive device (not shown) faces upward. In this case, the side surface 50B on an opposite side to a side surface 50A of the cartridge 50 is supported by the support surface 35 (see FIG. 4). Here, a center portion 50BA of the side surface 50B of the cartridge 50 in a longitudinal direction is supported by the inside support surface 37. On the other hand, end portions (that is, an edge portion) 50BB of the side surface 50B of the cartridge 50 in the longitudinal direction are supported by the outside support surface 39 by being brought into contact with the outside support surface 39. For example, the outside support surface 39 is brought into contact with the side surface 50B of the cartridge 50 and supports the side surface 50B of the cartridge 50 in a case where vibration is applied at the time of transportation, or the like. Here, the longitudinal direction of the side surface 50B corresponds to the case front-rear direction in a state in which the cartridge 50 is stored in the storage case 10.

As shown in FIG. 4 as an example, in the lower surface of the bottom plate 16, a frame portion 42 having a rectangular frame shape is formed between the inside support portion 36 and the outside support portion 38 (see FIG. 2).

As shown in FIG. 3 as an example, two support portions 34 positioned on a case front side from a center line CL passing through the center of the lower case 12 in the case front-rear direction and two support portions 34 positioned on a case rear side from the center line CL are different in the size of the inside support surface 37. In the following description, the two support portions 34 positioned on the case front side from the center line CL are referred to as support portions 34A, and the two support portions 34 positioned on the case rear side from the center line CL are referred to as support portions 34B.

As an example, the size of the outer shape of the inside support portion 36 in the support portion 34A is greater than the size of the outer shape of the inside support portion 36 in the support portion 34B.

As an example, the frame portion 42 formed on an opposite side to the support portion 34A in the bottom plate 16 is hereinafter referred to as a frame portion 42A. The frame portion 42 formed on an opposite side to the support portion 34B in the bottom plate 16 is hereinafter referred to as a frame portion 42B. The size of the frame portion 42B is a size to fit into the frame portion 42A.

Figure 6:
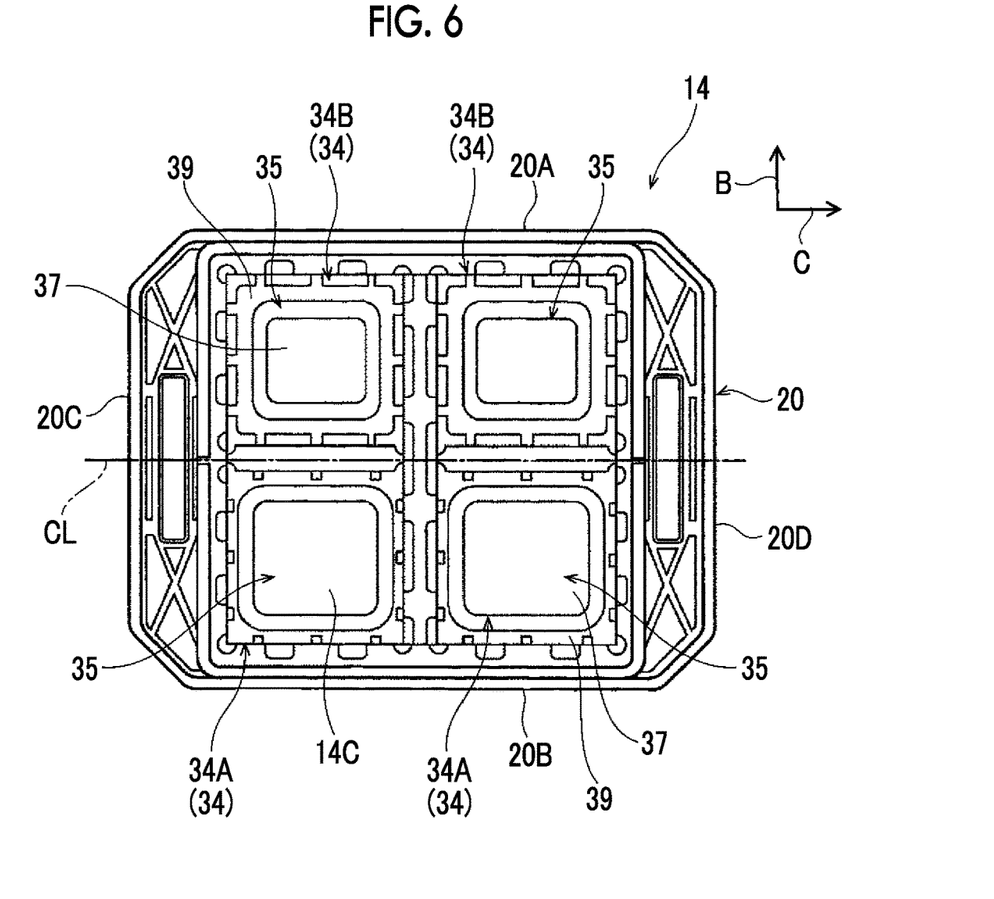
FIG. 6 is a bottom view of an upper case provided in the storage case of FIG. 1 as viewed from below.

As shown in FIG. 6 as an example, the shape of the upper case 14 and the shape of the lower case 12 are identical. Here, the term "identical" indicates identical in a meaning including an error that is generally allowed in the technical field to which the technique of the present disclosure belongs, and an error to such an extent not contrary to the spirit and scope of the technique of the present disclosure, in addition to completely identical. For this reason, in FIG. 6, reference symbols of respective portions of the upper case 14 are identical to reference symbols of the respective portions of the lower case 12 excluding the top plate 17 corresponding to the bottom plate 16.

A support surface 35 provided in the upper case 14 is an example of a "support surface" and a "second support surface" according to the technique of the present disclosure. An outside support surface 39 provided in the upper case 14 is an example of a "first surface" according to the technique of the present disclosure. An inside support surface 37 provided in the upper case 14 is an example of a "second surface" according to the technique of the present disclosure.

Here, the lower case 12 and the upper case 14 are superimposed in a direction in which the support surface 35 of the lower case 12 and the support surface 35 of the upper case 14 face each other, whereby the storage chambers 11 are formed in the storage case 10. In detail, the upper case 14 is placed on the lower case 12 such that a front surface of the flange portion 20 of the lower case 12 is superimposed on a front surface of the flange portion 20 of the upper case 14. Then, the engaging convex portion 24 and the engaging concave portion 26 of the lower case 12 are engaged with an engaging concave portion 26 and an engaging convex portion 24 of the upper case 14, respectively, whereby the lower case 12 and the upper case 14 are assembled. Here, in a case where the lower case 12 and the upper case 14 are assembled in a state in which a plurality of cartridges 50 are stored in the storage region 41 of the lower case 12, a plurality of cartridges 50 are stored in the storage case 10. With this, a package 52 where a plurality of cartridges 50 are stored in the storage case 10 is completed.

As an example, the lower case 12 and the upper case 14 are formed of a resin material. Examples of the resin material for forming the lower case 12 and the upper case 14 include polyethylene terephthalate. In the embodiment, the lower case 12 and the upper case 14 are formed of polyethylene terephthalate. As an example, the lower case 12 and the upper case 14 are integrated molded articles made of resin. For this reason, the support surface 35 of the lower case 12 of the embodiment is formed of a resin material. The support surface 35 of the upper case 14 of the embodiment is formed of a resin material.

Figure 7:
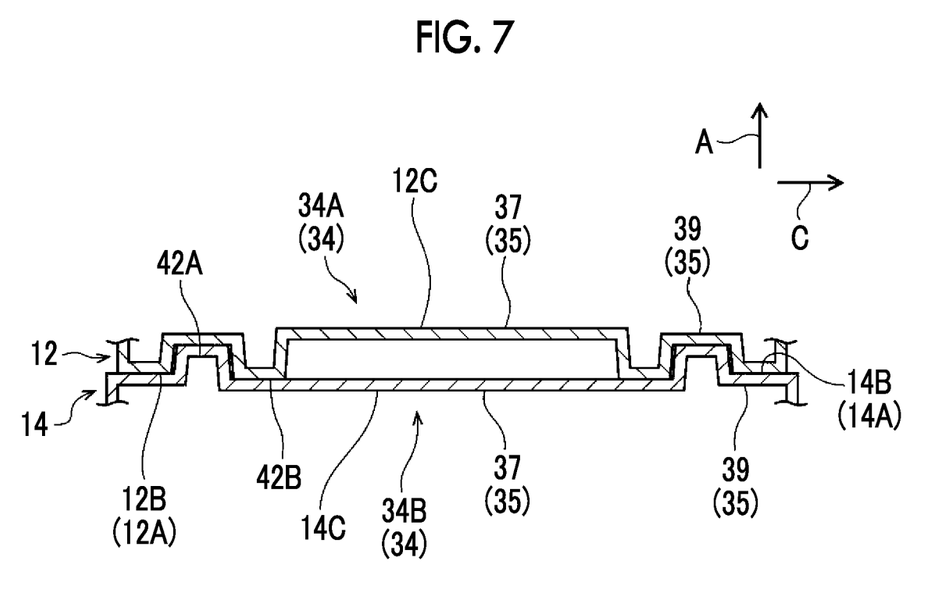
FIG. 7 is a sectional view corresponding to FIG. 4 in a state in which the lower case overlaps the upper case of FIG. 2.

As shown in FIG. 7 as an example, a lower surface 12A of the lower case 12 has a superimposing surface 12B including the frame portion 42A and the frame portion 42B. An upper surface 14A of the upper case 14 has a superimposing surface 14B including a frame portion 42A and a frame portion 42B. Here, the superimposing surface 12B and the superimposing surface 14B have shapes to be superimposed on each other. For example, in a case where the lower case 12 is placed on the upper case 14, the superimposing surface 12B of the lower case 12 is superimposed on the superimposing surface 14B of the upper case 14. As an example, the lower case 12 has a superimposing surface 12C including the support surface 35. Here, the superimposing surface 12C of the lower case 12 and the superimposing surface 14B of the upper case 14 have shapes to be superimposed on each other. As an example, the upper case 14 has a superimposing surface 14C including the support surface 35. Here, the superimposing surface 14C of the upper case 14 and the superimposing surface 12B of the lower case 12 have shapes to be superimposed on each other. The superimposing surface 12C of the lower case 12 is an example of a "first superimposing surface" according to the technique of the present disclosure. The superimposing surface 14B of the upper case 14 is an example of a "second superimposing surface" according to the technique of the present disclosure.

Next, the effects of the storage case 10 will be described.

In the storage case 10, the side surface 50B of the cartridge 50 is supported on the support surface 35 of the lower case 12. The support surface 35 has the outside support surface 39 and the inside support surface 37. The inside support surface 37 is positioned closer to the side surface 50B side than the outside support surface 39. For this reason, the side surface 50B of the cartridge 50 is supported on the inside support surface 37. Accordingly, with the configuration, for example, compared to a structure in which the side surface 50B of the cartridge 50 is supported on the whole surface of the support surface 35, it is possible to suppress abrasion of the outside support surface 39, whereby it is possible to reduce abrasion of the support surface 35. With this, abrasion powder generated by abrasion of the support surface 35 of the lower case 12 is reduced.

In the storage case 10, the outside support surface 39 is positioned on the outer peripheral edge side of the support surface 35, and the inside support surface 37 is positioned closer to the center side of the support surface 35 than the outside support surface 39. For this reason, the center portion 50BA of the side surface 50B of the cartridge 50 is supported by the inside support surface 37. Accordingly, with the configuration, it is possible to suppress cut of the outside support surface 39 by the end portion 50BB of the cartridge 50, for example, compared to a configuration in which the outside support surface 39 supports the end portion 50BB (that is, an edge portion) of the side surface 50B of the cartridge 50.

In the storage case 10, the support surface 35 is formed of a resin material.

Accordingly, with the configuration, it is possible to deform the support surface 35 with respect to the cartridge 50, for example, compared to a configuration in which the support surface 35 is formed of a metal material. With this, contact pressure between the cartridge 50 and the support surface 35 is reduced, and it is possible to suppress scratch of the side surface 50B of the cartridge 50.

In the storage case 10, the inside support surface 37 is a plane. Accordingly, with the configuration, a contact area of the inside support surface 37 and the side surface 50B of the cartridge 50 increases, for example, compared to a configuration in which the support surface 35 is curved in an arc shape. With this, it is possible to stabilize a storage posture of the cartridge 50.

In the storage case 10, the step 40 is formed between the inside support surface 37 and the outside support surface 39. Then, the dimension of the step 40 is equal to or greater than 0.1 mm and equal to or less than 1.3 mm. Here, in a case where the dimension of the step 40 is less than 0.1 mm, it is not possible to suppress abrasion of the support surface 35. On the other hand, in a case where the dimension of the step 40 exceeds 1.3 mm, the balance property of the cartridge 50 is deteriorated. Accordingly, with the configuration, it is possible to achieve both suppression of abrasion of the support surface 35 and the balance property of the cartridge 50, for example, compared to a case where the condition that the dimension of the step 40 is equal to or greater than 0.1 mm and equal to or less than 1.3 mm is not satisfied.

In the storage case 10, a plurality of support surfaces 35 are provided. Accordingly, with the configuration, for example, compared to a case where the number of support surfaces 35 is one, each of a plurality of support surfaces 35 can be made to support a plurality of cartridges 50. With this, it is possible to store a plurality of cartridges 50 in the storage case 10 in a distributed manner.

In the storage case 10, the lower case 12 and the upper case 14 are formed of polyethylene terephthalate. Accordingly, with the configuration, it is possible to suppress abrasion of the support surface 35, for example, compared to a configuration in which the lower case 12 and the upper case 14 are formed of a resin material easily generating abrasion powder.

In the storage case 10, each of the lower case 12 and the upper case 14 has the support surface 35. Accordingly, with the configuration, it is possible to suppress generation of abrasion powder by abrasion of the support surface 35 of each of the lower case 12 and the upper case 14, for example, compared to a configuration in which any one of the lower case 12 or the upper case 14 does not have the support surface 35.

In the storage case 10, the lower case 12 and the upper case 14 are superimposed in a direction in which the support surfaces 35 face each other, whereby the cartridge 50 is stored. Then, the side surface 50B of the cartridge 50 is supported on the support surface 35 of the lower case 12. The side surface 50A of the cartridge 50 is supported on the support surface 35 of the upper case 14. Accordingly, with the configuration, it is possible to suppress generation of abrasion powder by abrasion of the support surface 35 of each of the lower case 12 and the upper case 14, for example, compared to a configuration in which any one of the lower case 12 or the upper case 14 does not have the support surface 35.

In the storage case 10, the superimposing surface 12C of the lower case 12 and the superimposing surface 14B of the upper case 14 have shapes to be superimposed on each other. Here, the upper case 14 is put into the peripheral wall 18 of the lower case 12 in a state of being turned upside down, whereby the superimposing surface 12C of the lower case 12 and the superimposing surface 14B of the upper case 14 are superimposed. Accordingly, with the configuration, it is possible to reduce a space (for example, a height of a case superimposed in multiple stages) in a case where the lower case 12 and the upper case 14 are superimposed in multiple stages, for example, compared to a case where the superimposing surface 12C of the lower case 12 and the superimposing surface 12B of the upper case 14 have shapes to be not superimposed on each other. In the storage case 10, the superimposing surface 12B of the lower case 12 and the superimposing surface 14B of the upper case 14 have shapes to be superimposed on each other. For this reason, in a case where another storage case 10 is loaded on the storage case 10, the superimposing surface 12B of the overlying storage case 10 is superimposed on the superimposing surface 14B of the underlying storage case 10. Accordingly, with the configuration, it is possible to suppress looseness of the storage case 10 in a case where a plurality of storage cases 10 are loaded, for example, compared to a case where the superimposing surface 12B of the lower case 12 and the superimposing surface 12B of the upper case 14 have shapes to be not superimposed on each other.

In the package 52, a plurality of cartridges 50 are stored in the storage case 10 to which an example of the technique according to the present disclosure is applied. Accordingly, with the configuration, it is possible to suppress abrasion by the outside support surface 39, whereby it is possible to reduce abrasion of the support surface 35, for example, compared to a structure in which the storage case 10 supports the side surface 50B of the cartridge 50 on the whole surface of the support surface 35. With this, it is possible to reduce abrasion powder generated by abrasion of the support surface 35.

In the above-described embodiment, although the lower case 12 and the upper case 14 are formed of polyethylene terephthalate, the technique of the present disclosure is not limited thereto. For example, the lower case 12 and the upper case 14 may be formed of polypropylene or polystyrene.

In the storage case 10, the side surface 50A of the cartridge 50 is supported on the support surface 35 of the upper case 14. Accordingly, the support surface 35 of the upper case 14 can take the same effects as the support surface 35 of the lower case 12.

In the above-described embodiment, although the shape of the lower case 12 and the shape of the upper case 14 are identical shapes, the technique of the present disclosure is not limited to the configuration, and the shape of the lower case 12 and the shape of the upper case 14 may be different. For example, the lower case 12 may be made as a case body of a storage case, and the upper case 14 may be made as a cover of the storage case. Even in this case, each of the case body and the cover comprises the support surface 35, whereby it is possible to take the same effects as the storage case 10 of the above-described embodiment.

Figure 8:
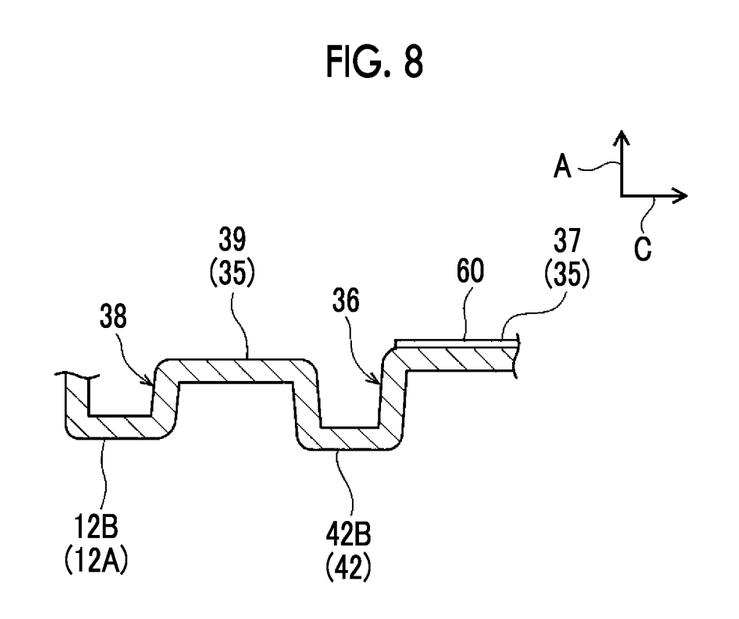
FIG. 8 is a sectional view of a storage case of a modification example corresponding to FIG. 5.

In the above-described embodiment, although the support surface 35 is formed of a resin material, the technique of the present disclosure is not limited to the configuration. For example, as shown in FIG. 8, a sheet-shaped soft member 60 may be provided on the upper surface of the support portion 34. Here, a front surface of the soft member 60 corresponds to the support surface 35. Examples of the soft member 60 include a cloth material, such as felt, and/or a cushion material, such as sponge. In this case, it is possible to suppress scratch of the side surface of the cartridge 50 compared to a configuration in which the support surface 35 is formed of a resin material.

In the above-described embodiment, although the side surface 50B of the cartridge 50 is in a linear shape, and the center portion 50BA of the side surface 50B is further recessed to an inner peripheral side of the cartridge 50 than the end portion 50BB of the side surface 50B. Even though the shape of the side surface 50B of the cartridge 50 is recessed to the inner peripheral side of the cartridge 50 as described above, in the storage case 10, the end portion 50BB of the side surface 50B is supported by the outside support surface 39, and the center portion 50BA of the side surface 50B is supported by the inside support surface 37. Accordingly, with the configuration, it is possible to suppress cut of the outside support surface 39 by the end portion 50BB of the side surface 50B, for example, compared to a configuration in which the end portion 50BB (that is, an edge portion) of the side surface 50B is supported only on the outside support surface 39.

In the above-described embodiment, although the upper case 14 is assembled onto the lower case 12, the technique of the present disclosure is not limited to the configuration. For example, the upper case 14 may be used as a lower case, and the lower case 12 may be used as an upper case. In this case, the upper case 14 is an example of a "first case member" according to the technique of the present disclosure. The lower case 12 is an example of a "second case member" according to the technique of the present disclosure.

In the above-described embodiment, although the storage case 10 comprises the lower case 12 and the upper case 14, the technique of the present disclosure is not limited to the configuration. For example, the storage case 10 is formed only of the lower case 12.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A storage case comprising:
a support surface that supports side surfaces of a plurality of magnetic tape cartridges stored in a storage chamber, wherein
the support surface has a first surface, and a second surface positioned closer to the side surfaces than the first surface,
the first surface has a rectangular frame shape positioned on an outer peripheral edge side of the support surface, and
the second surface is positioned closer to a center side of the support surface and closer to an inside of the storage chamber than the first surface, and is parallel to the first surface.

2. The storage case according to claim 1, wherein the support surface is formed of a resin material.

3. The storage case according to claim 1, wherein a step is formed between the first surface and the second surface, and
a dimension of the step is equal to or greater than 0.1 mm and equal to or less than 1.3 mm.

4. The storage case according to claim 1, wherein a plurality of support surfaces are provided.

5. The storage case according to claim 1, wherein the storage case is formed of polyethylene terephthalate.

6. The storage case according to claim 1, wherein the storage case is formed of polypropylene or polystyrene.

7. The storage case according to claim 1, further comprising:
a first case member having a first support surface as the support surface; and
a second case member having a second support surface as the support surface.

8. The storage case according to claim 7, wherein the first case member and the second case member store the magnetic tape cartridge by being superimposed in a direction in which the first support surface and the second support surface face each other.

9. The storage case according to claim 7, wherein the first case member has a first superimposing surface including the first support surface,
the second case member has a second superimposing surface facing an opposite direction to a direction that the second support surface faces, and
the first superimposing surface and the second superimposing surface have shapes to be superimposed on each other.

10. A package comprising:
the storage case according to claim 1; and
a plurality of magnetic tape cartridges.

* * * * *